April 6, 1965 W. LEATHERS 3,176,415
TEST SCORING AND RECORDING APPARATUS
Filed Aug. 26, 1963 3 Sheets-Sheet 1

INVENTOR.
WARD LEATHERS
BY
Edward R. Sounder

April 6, 1965 W. LEATHERS 3,176,415
TEST SCORING AND RECORDING APPARATUS
Filed Aug. 26, 1963 3 Sheets-Sheet 2

INVENTOR.
WARD LEATHERS
BY
Edward R. Lowndes

April 6, 1965   W. LEATHERS   3,176,415
TEST SCORING AND RECORDING APPARATUS
Filed Aug. 26, 1963   3 Sheets-Sheet 3
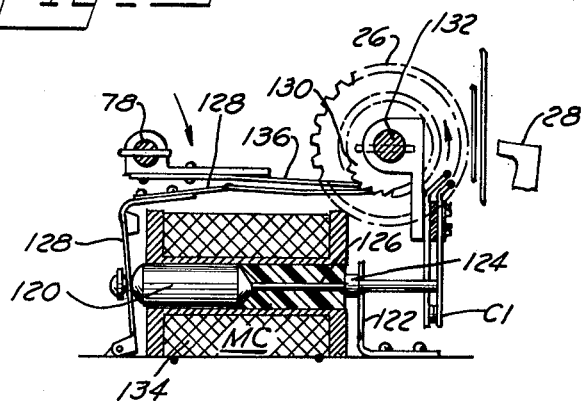
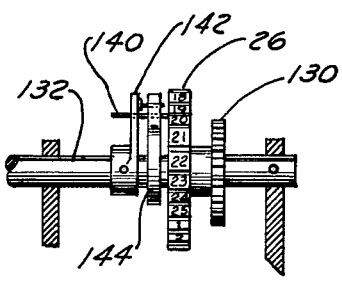
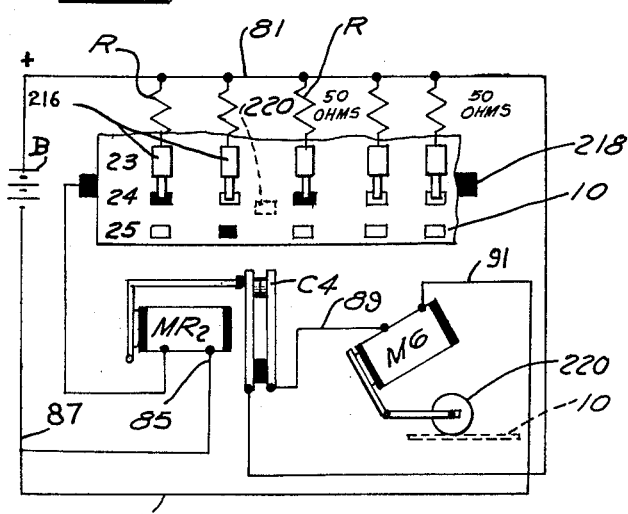
INVENTOR.
WARD LEATHERS
BY
Edward R. Lowndes

United States Patent Office 3,176,415
Patented Apr. 6, 1965

1

3,176,415
TEST SCORING AND RECORDING APPARATUS
Ward Leathers, 93 Walker St., Massapequa Park, N.Y.
Filed Aug. 26, 1963, Ser. No. 304,596
6 Claims. (Cl. 35—48)

The present invention relates to record controlled apparatus and more particularly to an improved test scoring and recording apparatus by means of which a student's test card, which has been perforated in various card columns by the student to represent his answers to a series of multiple-choice questions, may be processed in a novel manner whereby the number of correct answers rendered by the student may be totalized and the total printed on the card, the correct answer indicated by a special marking on the card whenever a particular question has been incorrectly answered, and, in a modified form of the apparatus, a different special marking made on the card to indicate when a student has unauthorizedly rendered plural answers to a given question. Still more specifically, the invention relates to test scoring and recording apparatus of the general type shown and described in my copending United States application, Serial No. 194,709, filed on May 9, 1962, and entitled "Test Scoring and Recording Machine," of which application the present one is a continuation-in-part.

Briefly, the machine or apparatus shown and described in my above-mentioned copending application involves in its general organization a first sensing station where a series of student's test cards are successively scanned columnarly for perforations representative of both correct and incorrect answers to a series of questions. The apparatus further includes a second sensing station where an answer card is repeatedly scanned for comparison with the test cards undergoing processing. The test cards are successively passed through the first sensing station in timed relation to the repetitive movement of the answer card through the second sensing station. The answer card is correctly perforated in columns which correspond to the columns of the test cards. At such time as simultaneous scanning or sensing of perforations in corresponding columns of the cards at both sensing stations takes place, a counter is actuated so that correct answers are thus totalized. At the end of the totalization, printing mechanism is actuated to print the total on the student's test card. At such time as the portion of the test card passing through the first sensing station remains imperforate to indicate that the student has not rendered an answer to a given question, or has incorrectly perforated the test card in response to such question, means are provided whereby the test card is marked in the same general answer region to indicate to the student where the correct perforation should have been, thus enlightening the student as to the correct choice.

The present apparatus affords novel means for disabling the marking means at such time as a student has, by correctly perforating his test card, rendered a correct answer to a given question. The invention further provides novel means for disabling both the marking and totalizing means when there is an absence of a card at the first sensing station, as for example after a card runout, or during the interval of time which exists between the passage of one card from the first sensing station

2 and the entry of the next succeeding card into the sensing station. The present apparatus, is a modified form thereof, also provides novel means whereby, when a student has unauthorizedly effected plural perforation of a card in response to a single given test question, a special function such as the marking of a tell-tale indicia on the test card may be effected to inform the examiner of such plural perforation.

The provision of an apparatus of the character briefly outlined above being among the principal objects of the invention, numerous other objects and advantages will become readily apparent as the following description ensues.

In the accompanying three sheets of drawings forming a part of this specification, two illustrative embodiments of the invention have been shown.

In these drawings:

FIG. 2 is an electrical circuit diagram of the apparatus;

FIG. 3 is a fragmentary detail view, partly in section and partly in elevation, illustrating the operation of a printing counter employed in connection with the present invention, together with certain relay mechanism associated therewith;

FIG. 4 is a fragmentary side elevational view, partly in section, illustrating a reset mechanism for the printing counter; and FIG. 5 is an electrical diagram illustrating additional circuitry which may be employed in connection with the circuitry of FIG. 1 for indicating unauthorized plural perforation of a student's answer card.

*General description*

Figure 1:
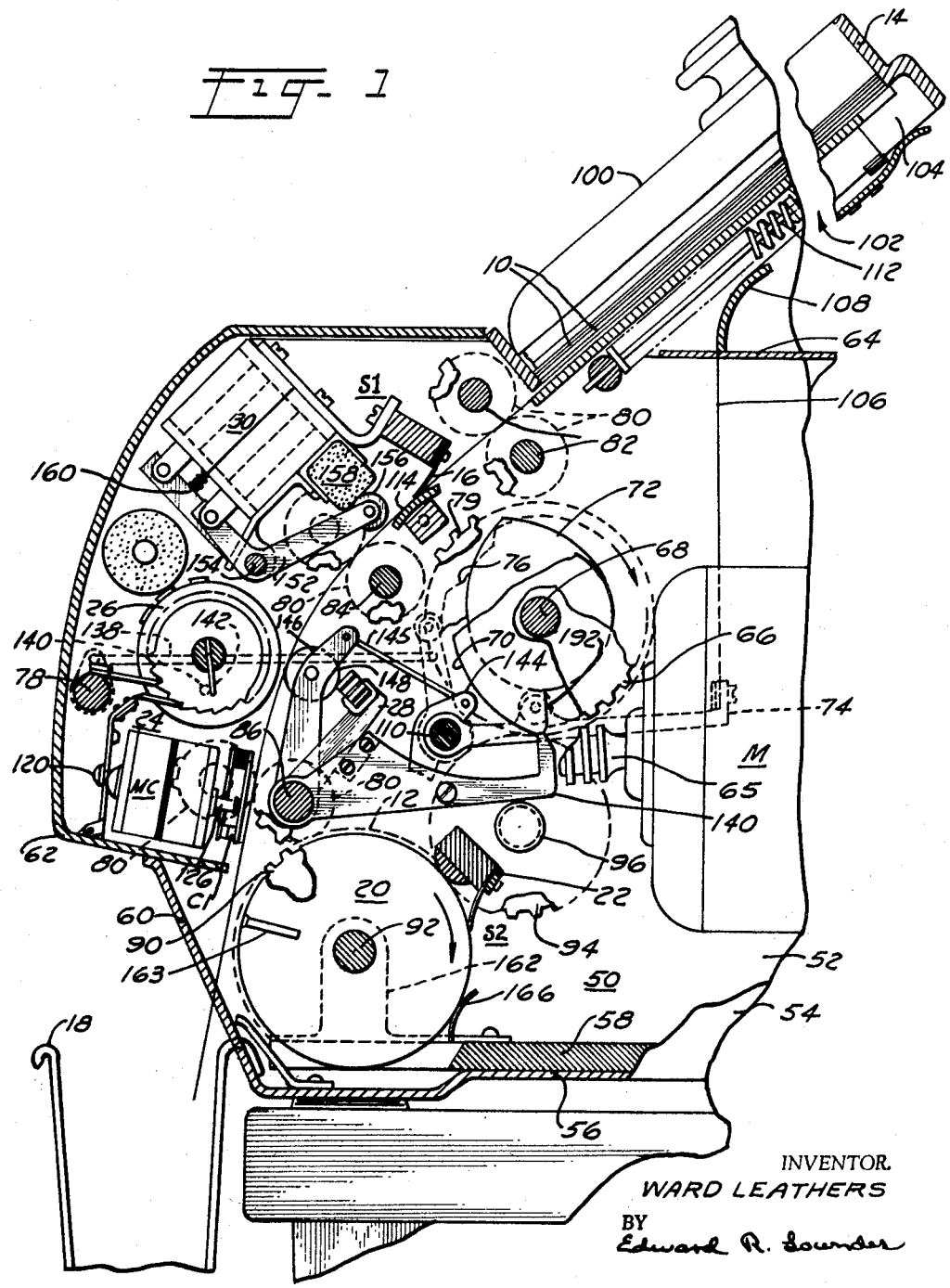
FIG. 1 is a fragmentary sectional view, somewhat schematic in its representation, taken substantially transversely and centrally through a test scoring and recording apparatus constructed in accordance with the principles of the present invention.

Referring now to the drawings in detail and in particular to FIG. 1, there has been disclosed schematically in this view a test scoring and recording apparatus of the general type shown and described in my above-mentioned copending application, Serial No. 194,709. It is to this type of apparatus that the present invention is applicable. For a full understanding of such a test scoring and recording apparatus reference may be had to such copending application but, for purposes of disclosure herein, it is deemed sufficient briefly to outline the nature and operation of the apparatus without regard to specific details except insofar as they are applicable to the present invention.

The apparatus is designed to operate upon a series of student's test cards 10 (FIG. 2) which have been perforated by the student to indicate his choices of answers to a series of test questions having several choices, only one of which is correct, and to compare such student choices with an answer card 12 which has been perforated to indicate the correct choices to the test questions. In the illustrated embodiment of the invention, the answer card makes provision for five columns of perforations accommodating five test questions, the perforations representing, by their positions transversely of the card, the correct answers. The test card 12 similarly makes provision for five columns of perforations and, if the punched holes or perforations in the test card correspond positionally to the perforations in the answer card all of the answers are correct. If a perforation in a test card does not correspond positionally with the correct perforation in the answer card, the student's answer is incorrect.

To process the test cards 10 and compare them with the answer card 12, the test cards are fed from a feed hopper 14 (FIG. 1) past a sensing station S1 where the perforations therein are electrically analyzed by a series of five sensing brushes 16, there being one brush for each column of perforations. From the sensing station S1 the cards are conducted to a discharge hopper 18. The answer card 12 is mounted on a rotary drum 20, the rotary movements of which are correlated with the linear movements of the test card 10 and the columns of perforations in the answer card are electrically analyzed by a series of five sensing brushes 22 disposed at a second sensing station S2. During the processing of any given test card, if corresponding brushes 16 and 22 simultaneously encounter respective perforations in the cards 10 and 12, a counter mechanism 24 is actuated and a print wheel 26 associated therewith is cumulatively advanced, each advancement of the wheel indicating that the student has correctly answered a question. At the termination of card comparison, the energy stored in a print hammer 28 is released and the hammer is caused to force a portion of the passing test card 10 against the print wheel 20 to imprint a totalization of the correct answers at an appropriate region on the card.

If a student has incorrectly answered a particular question by perforating a given column in a position that does not correspond or agree with the correctly perforated position in the corresponding column of the answer card 12, one of a series of five electromagnetically operated marking devices 30 is caused to imprint a daub of colored ink, for example red ink, on the test card in close proximity to the sensing brush and in the vicinity of the place which should have been perforated by the student had he correctly answered the question, thus giving to the student, when the card is returned to him, a visible indication of what the correct answer should have been. According to the present invention, novel means are provided for disabling the various marking devices 30 in the event that the student has correctly answered a question so that there will be no marking of the card except when an incorrect answer has been given. Additionally, according to the present invention, means are provided for disabling the marking devices 30 when there is an absence of a card at the sensing station, as for example when no cards are fed after a card run-out, or during the interval of time that exists between the passage of one card from the sensing station S1 and the entry of another and succeeding card into the sensing station, as well as the interval of time existing between the passage of the trailing edge of the card 12 from the sensing station S2 and the entry of the leading edge of the card into the sensing station.

In a modified form of the apparatus, means are provided whereby when a student has unauthorizedly attempted to give plural answers to a particular question by perforating more than one column in a test card 10 in response to a given test question, an indication, either visible or audible will be rendered, or, alternatively, a mark will be made upon the card to indicate such plural perforation of the test card.

Still referring to FIG. 1, the apparatus somewhat schematically shown in this view involves in its general organization a casing or housing 50 within which all of the operative instrumentalities of the apparatus are enclosed. The casing 50 includes side walls 52 and 54, a bottom wall 56 upon which there is supported a base plate 58, a front wall 60 including a removable section 62 which constitutes a front cover plate, a top wall, a portion of which is shown at 64, and a rear wall (not shown). An electric motor M suitably mounted within the casing 50 is operatively connected by a worm 65 and a cooperating gear 66 to a main drive shaft 68 rotatably supported at its ends in the side walls 52 and 54. The shaft 68 carries a cam 70 for operating the previously mentioned print hammer 28, a cam 72 for operating a card picker feed arm 74, a cam 76 for operating a reset bail 78 by means of which the previously mentioned print wheels 26 may be returned to zero indications, and a gear 79 for driving a series of card-flow rolls 80, as well as for rotating the card-carrying drum 20. Three pairs of the card-flow rolls 80 have been illustrated including an upper pair carried on shafts 82, an intermediate pair carried on shafts 84, and a lower pair carried on shafts 86, the shafts 82, 84 and 86 extending between the side walls 52 and 54. The upper and intermediate pairs of rolls are driven from the gear 78 while the lower pair of rolls are driven by a gear 90 carried on a shaft 92 which extends between the side walls 52 and 54. The shaft 92 also serves to rotatably support the card-carrying drum 20. The shaft 92, and consequently the gear 90 and drum 20, is operatively connected in driven relationship to the shaft 68 by means of an intermediate gear 94, rotatably carried on a stud 96 fixedly secured to the side wall 52.

The test cards 10 are placed in the feed hopper 14 in stacked relationship as shown in FIG. 1 and are maintained in position within the hopper by means of the usual weight 100. A conventional picker mechanism 102 serves to withdraw the cards 10, one at a time from the bottom of the stack of cards and advance the same to the sensing station S1. The illustrated form of picker mechanism includes a reciprocable picker element 104 to which there is attached a flexible tape 106 which passes around a curved polished steel guide 108 and has one end thereof attached to the distal end of the picker feed arm 74. The proximate end of the feed arm 74 is rotatably mounted on a shaft 110 which extends transversely of the casing between the side walls 52 and 54 and is designed to be oscillated by means of the cam 72 on the shaft 68. The picker element 104 is maintained in its retracted position by means of a spring 112. The design of the power train extending from the motor driven worm 65 to the shaft 92 on which the drum 20 is mounted, and the nature of the cam 72 and feed rollers 80 are such that successive test cards 10 are fed through the sensing station S1 in timed relation to the repetitive passage of the answer card 12 through the sensing station S2. When operatively installed upon the drum 20, the answer card 12 is so positioned that the trailing edge of the card will leave the sensing station S2 at substantially the same time that the trailing edge of a given card 10 leaves the sensing station S1, and so that the leading edge of the answer card 12 will enter the sensing station S2 at substantially the same time that the leading edge of a test card 10 enters the sensing station S1. Thus at both sensing stations the sensing brushes 16 and 22 will simultaneously encounter respective gaps which exist between adjacent opposed card edges. At such times, all of the sensing brushes 16 make electrical contact with a transversely extending contact plate 114, while all of the sensing brushes 22 will similarly make electrical contact with the metal surface of the drum 20.

Still referring to FIG. 1, and additionally to FIGS. 2 and 3, the counter mechanism 24 is operatively supported upon the plate 62 and it includes a combined print wheel-actuating and relay magnet MC (see also FIG. 2) provided with a movable core 120 which is normally maintained in a retracted position by means of a spring 122 secured to the cover plate 62 and which bears against a protuberance 124 formed on an operating finger 126 which constitutes an extension of the movable core 120. The rear or left hand end of the core 120, as viewed in FIG. 3, is operatively connected to a pivoted pawl 128 which cooperates with a ratchet wheel 130 secured to a shaft 132 and which may be integrally formed with the previously mentioned print wheel 26. Upon energization of the winding 134 of the magnet MC the core 120 and its extension 126 will be moved forwardly or to the right as seen in FIG. 3, thus causing the pawl 128 to advance the ratchet wheel 130, and consequently the print wheel 126, the latter being moved one numerical indication for each successive energization of the magnet MC. A holding pawl 136 mounted on the reset bail 78 maintains the successive advancement of the ratchet wheel 130 but allows the ratchet and print wheels to be restored to a zero indication when the reset bail is actuated under the control of the cam 76 through a cam follower and linkage mechanism 138. The operating finger 126 is designed for cooperation with a pair of normally closed contacts C1, the function of which will be set forth presently when the electrical diagram of FIG. 2 is discussed.

The print wheel 26 and its associated ratchet wheel 130 are normally maintained in their position of zero indication by means of an eccentric pin 140 on the print wheel and which normally bears against a stop arm 142 mounted on the shaft 132. An involute coil spring 144 also bears against the pin 140 and urges the print wheel 26 in a clockwise direction as viewed in FIG. 3 so as to yieldingly carry the eccentric pin 140 against the stop arm 142. Thus when the reset bail 78 is actuated under the influence of the cam 76, the holding pawl 136 is momentarily withdrawn from the ratchet wheel 130 to allow the print wheel to be restored to its zero indication.

The print hammer 28 which effects the printing operatoin near the end of the cycle of machine operation is mounted for swinging movement on one of the shafts 86 which carries the card-flow rollers 80 and it is yieldingly biased toward the print wheel 26 by a spring pressed cam follower arm 140. The cam 70 is provided with a sharp drop-off portion which, when encountered by the cam follower arm 140 allows the print hammer to be projected forwardly and against the print wheel 26 to effect the printing operation on the test card 10.

Means are provided for disabling the print hammer 28 when no card appears between the print hammer and the print wheel 26, this means assuming the form of a stop pawl 144 carried on the shaft 110 and capable of being operatively positioned in the path of movement of the cam follower arm 140 under the control of a link 145 connected to a feeler arm 146 having a roller 148 mounted thereon and which is lightly spring biased against the cards which pass from the sensing station S1 and travel toward the hopper 18. In the absence of a card 10 in printing position, the roller 148 shifts in a direction to cause the link 145 to move the stop pawl 144 to its blocking position with respect to the movement of the cam follower arm 140.

Referring now to FIGS. 1 and 2, each of the five marking devices 30 includes an electromagnet. The various magnets may be of the dual core type and the cores 150 thereof are operatively connected to a generally L-shaped arm 152 pivoted as at 154 to a portion of the magnet casing and carrying a marking roller 156. The roller 156 normally rests against an inked felt pad 158 where it is held in this retracted position by means of a spring 160. Upon energization of the magnet and retraction of the cores 150, the inking roller 156 will leave the pad 158 and move into marking engagement with a card 10 passing through the sensing station S1. The various inking rollers 156 are so positioned that they will effect marking of the card 10 in the immediate vicinity of the respective sensing brushes 16, the positions of the inking rollers being indicated in dotted lines in FIG. 2.

The card-carrying drum 20 may be of any suitable type. Preferably it is of the type shown and described in my copending United States application, Serial No. 281,208, filed May 17, 1963, and entitled "Card-Retaining Matrix Drum for Statistical Machines." The full details of the drum 20 have not been illustrated herein but for purposes of discussion in connection with the present invention it is sufficient to point out that the drum is in the form of a metal cylinder operatively installed upon the base plate 58 for rotation about a horizontal axis. The mounting for the drum may consist of a pair of standards, one of which is shown at 162, the standards being secured to the base plate 58 and serving rotatably to support therebetween the drum-carrying shaft 92. The cylinder side wall of the drum is formed with a slot 163 therein adapted to receive the leading transverse edge region of the answer card 12 as indicated at 164 in FIG. 2, the card then being turned laterally and wrapped around the drum 20 in a direction opposite to the direction of rotation of the drum, i.e. in a direction opposed to the direction of the arrow in this view. Suitable card retaining rollers (not shown) may be employed to maintain the card in its wrapped condition during drum rotation, such rollers being well known and commonly employed in the art for card retaining purposes. A contact brush 166 secured to the base plate 58 establishes an electrical lead-off whereby the drum may be electrically connected in the circuitry which, to a large extent, constitutes the present invention.

The arrangement of parts thus far described, with the exception of certain details associated with the combined print wheel actuating and relay magnet MC of the counter mechanism 24; constitutes the subject matter of my copending application, Serial No. 194,709, and no claim is made herein to any novelty associated with the same, the novelty of the present invention residing rather in certain electrical and mechanical instrumentalities which, in combination with their associated electric circuitry, perform such functions as disabling of the entire group of five marking devices 30 at such time as a correct student answer has been indicated by the simultaneous sensing of perforations in a test card 10 and the answer card 12 in corresponding columns by the sensing brushes 16 and 22 respectively, thereby preventing any red ink marking on the test card at this time; similarly disabling these five marking devices as well as the counter mechanism 24 when there is an absence of a test card in the apparatus; disabling of the counter 26 and marking devices 30 at such time as the sensing brushes 16 and 22 are at inbetween positions between the opposed edges of cards leaving and entering the sensing zones S1 and S2; and effecting a visible indication or recording on the test card 10 by a telltale indicia when a student has indicated by multiple perforations of a test card in different columns in response to the same test question; all in a manner that will now clearly be set forth in detail.

*Starting circuit*

Referring now to the circuit diagram of FIG. 2, the electric motor M which effects rotation of the drum 20 is disposed in a motor circuit which extends from a suitable source of current supply S, through a master switch MS, leads 11, 13 and the motor M, back to the source S. The switch MS, when closed, not only makes current available to the motor M, but also it makes low voltage current available for the various relay and other magnets associated with the apparatus, as well as for the sensing instrumentalities which effect read-out indications of the various card perforations in the test card 10 and answer card 12. Energization of the motor M serves to rotate the drum 20 in the manner previously described and, when the switch MS is open, a push button PB may be employed to energize the motor M by small incremental movements for the purpose of causing the slot 162 in the drum 20 to register with the open front of the machine casing when the cover plate 62 is removed. The push button circuit extends from the source S through the switch MS, leads 11, 15, push button PB, and lead 17, back to the source.

*Correct answer accumulation*

Cumulative totalization of the number of correct answers effected by a student on a given test card preparatory to printing of the total on the card by the print hammer 28 is effected under the control of such sensing brushes 16 and 22 as may simultaneously encounter perforations in corresponding columns in the cards 10 and 12 respectively. When such a condition occurs, a circuit will be established from the low voltage source (represented by the battery B) through leads 19, 21, switch MS, lead 23, a pair of normally closed cam controlled contacts C2, lead 25, a pair of normally closed relay-operated contacts C3, leads 27, 29, counter magnet MC, lead 31, contact plate 114, sensing brush 16 (shown in contact with the contact plate 114), leads 33, 25, sensing brush 22 (shown in contact with the drum 20) drum 20, and leads 37, 39, 41, back to the low voltage source B.

Closure of the circuit just described effects energization of the counter magnet MC and consequent forward movement of the ratchet-actuating pawl 128 (see also FIG. 3), thus advancing the print wheel 26 one step or numeral designation. At the same time movement of the magnet core 120 to the right as seen in FIG. 3 effects opening of the contacts C1 to disable a card-marking circuit to prevent operation of the marking devices 30 in a manner and for a purpose that will be made clear presently. Such disabling of the card-marking circuits is desirable inasmuch as when a student has rendered a correct answer the perforation which he has placed in the associated column will suffice to indicate that the answer is correct and needs no further pointing out.

As the test card 10 continues past the sensing station S1, repetitive energization of the counter magnet MC takes place for each correct perforation which appears in the various columns of the card and, after the totalization is complete at the end of column-sensing operations, the cam follower arm 140 encounters the drop-off portion 142 of the cam 70 and the printing hammer 28 is impelled against the card 10 to, in turn, force the latter against the print wheel 26 and effect a printing on the card of the total number of correct answers which have been given, all in the manner previously described.

*Correct answer marking on the test card*

When a student renders an incorrect answer to any one of the twenty-five test questions provided for in his examination sheet by effecting a perforation in a column other than the correct column for that particular question, one of the sensing brushes 16 at the sensing station S1 will encounter such perforation but the corresponding sensing brush 22 at the sensing station S2 will encounter no corresponding perforation. The counter accumulation circuit just described in connection with the rendering of a student's correct answer will thus be interrupted by the particular sensing brush 22 at the sensing station S2 which fails to make contact with the drum 20 by reason of the lack of a perforation at this point. Therefore, the counter magnet MC will not become energized to open the pair of contacts C1. These contacts C1 are disposed in a marking circuit which, when energized, causes a daub of ink of a suitable color (for example red ink) to be applied to the test card 10 in the vicinity of the sensing brush 16 at the sensing station S1 and which is in register with the particular column which should have been perforated by the student. The correct answer for any given test question is indicated by a perforation in the answer card 12 and thus when one of the sensing brushes 22 encounters such a perforation a marking circuit will be directed to the particular magnet M1 to M5 inclusive which serves the marking device 30 for the column in the test card 10 which should have been correctly perforated by the student. Suppose for example that the correct answer to a given test question should result in a perforation in the extreme left hand column of the card 10 as seen in FIG. 2, but that the student has rendered an incorrect answer by perforating the extreme right hand column. The answer card 12, of course, will be perforated in the extreme left hand column as shown in FIG. 2. When the particular corresponding longitudinal regions of the two cards 10 and 12 arrive at their respective sensing stations, a circuit will then exist from the low voltage source B through leads 19, 21, switch MS, lead 23, contact C2, lead 25, contact C3, leads 27, 51, contacts C1 (now closed by reason of the deenergization of the magnet MC), leads 53, 55, 57, 59, 61, marking magnet M1, leads 63, 35, sensing brush 22, drum 20, and leads 37, 39, 41, back to the low voltage source B. Such energization of the magnet M1 will cause movement of the associated arm 152 so that the marking wheel 156 will apply a daub of red ink to the left hand column of the card 10 as viewed in FIG. 2, at the approximate position where this column should have been perforated to indicate the correct answer to the test question. In actual practice, the rapid movement of the card and the time delay factor required for a full movement of the arm 152 will cause the red ink daub to be placed substantially precisely at the region where the student should have made his perforation.

Parallel marking circuits are provided for the magnets M2, M3, M4, and M5 and need not be described herein due to their similarity with the marking circuit for the magnet M1 just described.

Since the circuit through the counter magnet MC is open due to failure of the extreme left hand sensing brush 16 to encounter a perforation under the incorrect answer conditions specified above, no print wheel accumulation will take place, the only function being a red ink marking of the test card as outlined above.

It should be recalled at this point that when a student has given a correct answer to the test question, as for example when he has correctly perforated the left hand column of the test card 10, the previously described circuit through the counter magnet MC will be energized for print wheel accumulation purposes, as well as for relay operation to open the contacts C1 and disable the red ink marking circuit through the magnet M1 just described.

*Card run-out operations*

In the event of a card run-out, as for example after the last test card 10 in the stack of cards contained in the hopper 14 has passed through the machine and been discharged into the hopper 18, or for any other reason such as a faulty card feed due to a torn or damaged card, no card arrives at the sensing station S1, a sixth sensing brush 200 engages a cooperating contact plate 202 which is electrically disassociated from the contact plate 114, and a circuit then exists from the source B, through leads 19, 65, contact plate 202, brush 200, lead 67, relay magnet MR, and leads 69, 41, back to the source B. The relay magnet MR is associated with the previously mentioned pair of contacts C3 and serves to open these normally closed contacts when energized. Energization of the magnet MR due to contact of the brush 200 with contact plate 202 in the absence of any interverting card 10 thus opens the contacts C3 and disables the previously mentioned counter marking circuits, all of which include these contacts C3.

*Card gap disabling means*

The previously mentioned normally closed contacts C2 are disposed in series relationship with the contacts C1 and C3 and, moreover, they are disposed between the master switch MS and the contacts C3 so that they control the flow of current to both the totalizing and red ink printing circuits. Thus, when these contacts C2 become open, no current may flow in any of the low voltage circuits associated with the apparatus. During normal machine operations, opening of the contacts C2 will disable the apparatus except for rotation of the card-retaining drum. A cam 204 on the drum shaft 92 is so disposed that it will effect momentary opening of the contacts C2 at such time as the card gap existing between the leading and trailing edges of the wrapped card 12 passes through the sensing station S2. Thus, at this time when the four sensing brushes 22 make electrical contact with the metal drum 20, the contacts C2, being open, will prevent all machine functions from taking place including both the totalizing and red ink printing functions.

*Unauthorized plural student card perforation*

Under certain circumstances it may be desirable to make provision for performing a machine function when a student's card 10 which has been perforated more than once in the same transverse row is encountered at the sensing station S1. Such unauthorized plural perforation of the card in response to a single test question may be effected by a student in an effort to increase his chance of tally with the correct answer performation in the answer card 12. Without a suitable safeguard for such a contingency, a student, by unauthorizedly perforating a given transverse row in two places instead of one, could double his chances of having the apparatus register and totalize a correct answer for that particularl question. By effecting five perforations in the row, the student would be assured of a correct tally but, of course, at the increased risk of on-sight detection on the part of the examiner. The functions which may be selected for detection of such plural perforation are varied. If desired an audible or visual indication may be rendered by the appaaratus, the apparatus may be stopped, or a mark may be recorded on the student's card 10. For exemplary purposes, in FIG. 5, this latter operation has been illustrated in conection with a modified form of the apparatus wherein a series of five sensing brushes 216 are disposed at the sensing station S1, these brushes being in addition to the sensing brushes 16. The brushes 216 are preferably positioned in close proximity to the brushes 16 either slightly in advance thereof or in arrears thereof, although they may be positioned at any region along the longitudinal extent of the card as it passes through the sensing station. Each brush 216 is connected through a resistor R to a common lead 81 leading from the positive side of a suitable low voltage source which may be the battery B of FIG. 2. The various resistors are of equal ohmic value, for example 50 ohms. The brushes 216 cooperate through the perforations in the student's card 10 with a contact plate 218. The contact plate 218 is connected by a lead 83 to a relay magnet MR2 which, in turn, is connected to the negative side of the source through leads 85 and 87. The common lead 81 is also connected to a pair of normally open contacts C4 and the latter are connected by a lead 89 to a marking magnet M6, the magnet being connected by marking leads 91 and 87 to the negative side of the source. Energization of the marking magnet M6 serves to actuate a marking roller 220 similar to the marking rollers 156 but which may carry a supply of ink of a color different from the color of the ink supplied by such rollers, for example green ink. The roller 220 may be positioned to apply a daub of green ink to the student's card 10 in the central longitudinal region thereof as indicated by the dotted line disclosure of this roller in FIG. 5.

The rating of the relay magnet MR2 is such that it requires for its effective energization a current value appreciably in excess of that which is available in the series circuit involving only one of the resistors R. It will however become effectively energized when energized by the current which obtains in the series-parallel circuit including two of the resistors R.

In the operation of the modified form of the apparatus as shown in FIG. 5, if, for example, a student has perforated his student's card 10 in response to the twenty-fourth question with two perforations as shown in this view, a circuit will be established from the source through the common lead 81, two of the resistors R, contact plate 218, lead 83, relay magnet MR2, and leads 85, 87, back to the source. Effective energization of the magnet MR2 will take place since an appreciable energizing current will then pass through the winding of the magnet MR2 and the contacts C4 will become closed. Closure of the contacts C4 will establish a circuit extending from the source, through lead 81, contacts C4, lead 89, magnet M6 and leads 91, 87 back to the source. Energization of the magnet M6 will cause actuation of the marking roller 220 and thus the student's card 10 will have applied to it a daub of green ink, thus indicating to the examiner at the time the cards are inspected that the plural perforation has taken place. If desired, the normally open contacts C4 may be disposed in the circuit for the motor M and the magnet M6 dispensed with. In such an instance when the plurally perforated card is encountered at the sensing station S1, the motor circuit replaced by a pair of normally closed contacts and the latter may be disposed in the circuit for the motor M. In such an instance when the plurality perforated card is encountered at the sensing station S1, the motor circuit will become open to stop the operation of the apparatus. Similarly, the magnet M6 may be replaced by an electric buzzer or other audible signal-emitting device, or it may be replaced by an electric lamp or other visual signal-emitting device. Irrespective however of the nature of the particular work circuit involved for plural perforation detection purposes, the essential features of the invention are at all times preserved.

The invention is not to be limited to the exact arrangement of parts shown in the accompanying drawings or described in this specification, nor to the identical circuitry portrayed, since various changes in the details of construction may be resorted to without departing from the spirit of the invention. For example, while the invention has been illustrated herein in connection with student and answer cards which make provision for a single composite column representing twenty-five five-choice answer selections, it is obvious that the apparatus may, by suitable modification, be designed to accommodate a greater or a lesser number of answer selections, answers involving a greater or lesser number of choice responses, or a greater number of composite answer columns. In the latter instance it is merely necessary to duplicate many of the operative machine instrumentalities associated with the low voltage phase of machine operation, while retaining the single motor and high voltage circuit therefor. Such duplication has been represented by the block diagrams 250, 252 and 254 in the circuit diagram of FIG. 1. Therefore, only insofar as the invention has particularly been pointed out in the accompanying claims is the same to be limited.

Having thus described the invention, what I claim and desire to secure by Letters Patent is:

1. In a machine for grading and marking student's test cards according to their comparison with indicia appearing on a similar answer card and relating to multiple choice responses to a series of questions, the test and answer cards having correspondingly arranged columns of multiple choice positions, the multiple choice positions of the answer card having indicia applied in accordance with correct responses to said questions, and the positions of the test cards having indicia variously applied so as to be indicative of correct and incorrect answers to said questions, means establishing a first sensing station for the test cards, means establishing a second sensing station for the answer card, means for impelling the test cards successively through the first sensing station in endwise fashion, means for repeatedly impelling the answer card through the second sensing station in timed relation to the movement of the test cards through the first sensing station, means at said first and second sensing stations for comparatively sensing the indicia on the test cards and answer card respectively, a series of energizable marking devices at said first sensing station and operable when energized to mark respectively the multiple choice positions on successive test cards passing through said first station in accordance with the sensed indicia on the answer card, means normally responsive to the sensing of an indicia on the answer card for energizing a corresponding marking device, and means responsive to the simultaneous sensing of corresponding indicia on a test card and the answer card for disabling the energizing means for the corresponding marking device.

2. In a machine for grading and marking student's test cards according to their comparison with indicia appearing on a similar answer card and relating to multiple choice responses to a series of questions, the test and answer cards having correspondingly arranged columns of multiple choice positions, the multiple choice positions of the answer card having indicia applied in accordance with correct responses to said questions, and the positions of the test cards having indicia variously applied so as to be indicative of correct and incorrect answers to said questions, means establishing a first sensing station for the test cards, means establishing a second sensing station for the answer card, means for impelling the test cards successively through the first sensing station in endwise fashion, means for repeatedly impelling the answer card through the second sensing station in timed relation to the movement of the test cards through the first sensing station, paired sensing elements at the first and second sensing stations for comparatively sensing the indicia on the test cards and answer card respectively, a series of energizable marking devices at said first sensing station and operable when energized to mark respectively the multiple choice positions on successive test cards passing through the first sensing station in accordance with the indicia on the answer card, a source of energizing current for said marking devices, a normally closed series circuit for each marking device and including said source of energizing current and one of the sensing elements at the second sensing station whereby the sensing of an indicia on the answer card by a sensing element at the second sensing station will effect energization of a corresponding marking device and marking of a corresponding position on a test card at the first sensing station, and relay means common to all of the sensing elements at both sensing stations for disabling said series circuits upon simultaneous sensing of corresponding indicia on a test card and the answer card.

3. In a machine for grading and marking student's test cards, the combination set forth in claim 2, wherein said relay means for diasabling said series circuits comprises a pair of normally closed contacts common to said series circuits, a relay magnet operable upon energization thereof to open said contacts, said relay magnet being connected at one side to said source of current and at the other side to said paired sensing elements whereby upon simultaneous sensing of corresponding indicia on a test card and the answer card said relay magnet will become energized.

4. In a machine for grading and marking student's test cards according to their comparison with perforated data appearing on a similar answer card and relating to multiple choice responses to a series of questions, the test and answer cards having correspondingly arranged columns of multiple choice positions, the multiple choice positions of the answer card being perforated in accordance with correct responses to said questions, and the positions of the test cards being variously perforated so as to be indicative of correct and incorrect answers to said questions, means establishing a first sensing station for the test cards, means establishing a second sensing station for the answer card, means for impelling the test cards successively through the first sensing station in endwise fashion, means for repeatedly impelling the answer card through the second sensing station in timed relation to the movement of the test cards through the first sensing station, paired sensing brushes at the first and second sensing stations respectively for the comparative sensing of the perforations in the test cards with the perforations in the answer card, a series of energizable marking devices at said first sensing station and operable when energized to mark respectively the multiple choice positions on successive test cards passing through the first sensing station in accordance with the perforations in the answer card, an energizable totalizing counter, a source of energizing current, means connecting each pair of sensing brushes to said source of energizing current in series relationship through said counter whereby the simultaneous sensing of corresponding perforations on a test card and the answer card will effect energization of the counter, means connecting each marking device to one of the sensing brushes at the second sensing station and to said source of current whereby the sensing of a perforation in the answer card will effect energization of a corresponding marking device, energizable relay means operable upon energization thereof to disable all of said marking devices, and means connecting said relay means to said source of current and to each pair of sensing brushes at the first and second sensing stations whereby the simultaneous sensing of corresponding perforations at the first and second sensing stations will effect energization of said relay means.

5. In a machine for grading and marking student's test cards, the combination set forth in claim 4 including, additionally, an additional sensing brush at the first sensing station for sensing the card gaps existing between the opposed leading and trailing edges of adjacent successive test cards passing through the first sensing station, additional energizable relay means operable upon energization thereof to disable all of said marking devices and to disable said counter and means connecting said additional relay means to said additional sensing brush and to said source of current whereby sensing of a card gap will effect energization of said additional relay means.

6. In a machine for grading and marking student's test cards according to their comparison with perforated data appearing on a similar answer card and relating to multiple choice responses to a series of questions, the test and answer cards having correspondingly arranged columns of multiple choice positions, the multiple choice positions of the answer card being perforated in accordance with correct responses to said questions, and the positions of the test cards being variously perforated so as to be indicative of correct and incorrect answers to said questions, means establishing a first sensing station for the test cards, means establishing a second sensing station for the answer card, a rotary drum for supporting the answer card in partial wrap-around fashion, means for repeatedly impelling the test cards successively through the first sensing station in endwise fashion, means for rotating said drum in timed relation to the movement of the test cards through the first sensing station to repeatedly impel the answer card through the second sensing station, paired sensing brushes at the first and second sensing stations respectively for the comparative sensing of the perforations in the test cards with the perforations in the answer card, an energizable totalizing counter, a source of energizing current, means connecting each pair of sensing brushes to said source of current in series relationship through said counter whereby the simultaneous sensing of corresponding perforations on a test card and the answer card will effect energization of the counter, a series of additional sensing brushes at the first sensing station for sensing the perforations in the test cards, means establishing a work circuit, a relay magnet operable upon energization thereof to control said work circuit, a plurality of resistors, one for each of said additional sensing brushes means connecting said resistors in parallel to said source of current, means connecting each of said additional sensing brushes to its respective resistor, means connecting said sensing brushes in parallel to said relay magnet, and means connecting said relay magnet to said source of current whereby the flow of current through the relay magnet will be a function of the number of perforations in a test card which are simultaneously sensed by said additional sensing brushes, the ohmic value of the individual resistors and the rating of said relay magnet being such that the relay magnet is responsive to the combined current flowing through any two resistors but is non-responsive to the current flowing through a single resistor.

References Cited by the Examiner

UNITED STATES PATENTS

| | | | |
|---|---|---|---|
| 2,010,653 | 8/35 | Warren | 35—48 |
| 2,041,758 | 5/36 | Harding | 35—48 |
| 2,048,976 | 7/36 | Sveda et al. | 35—48 |
| 2,052,442 | 8/36 | Black | 35—48 |
| 2,150,256 | 3/39 | Warren | 35—48 |
| 2,310,437 | 2/43 | Johnson | 35—48 |
| 2,528,828 | 11/50 | Henry | 35—48 |
| 2,598,155 | 5/52 | Betts | 235—61.6 |
| 2,694,266 | 11/54 | Roeder | 35—48 |
| 2,944,734 | 7/60 | Martin | 235—61.7 |
| 3,050,248 | 8/62 | Lindquist | 235—61.7 |
| 3,137,949 | 6/64 | Smith | 35—48 |

JEROME SCHNALL, *Primary Examiner.*